Sept. 10, 1935.   H. B. ALLEN   2,013,943
CIRCULAR SAW
Filed March 29, 1933
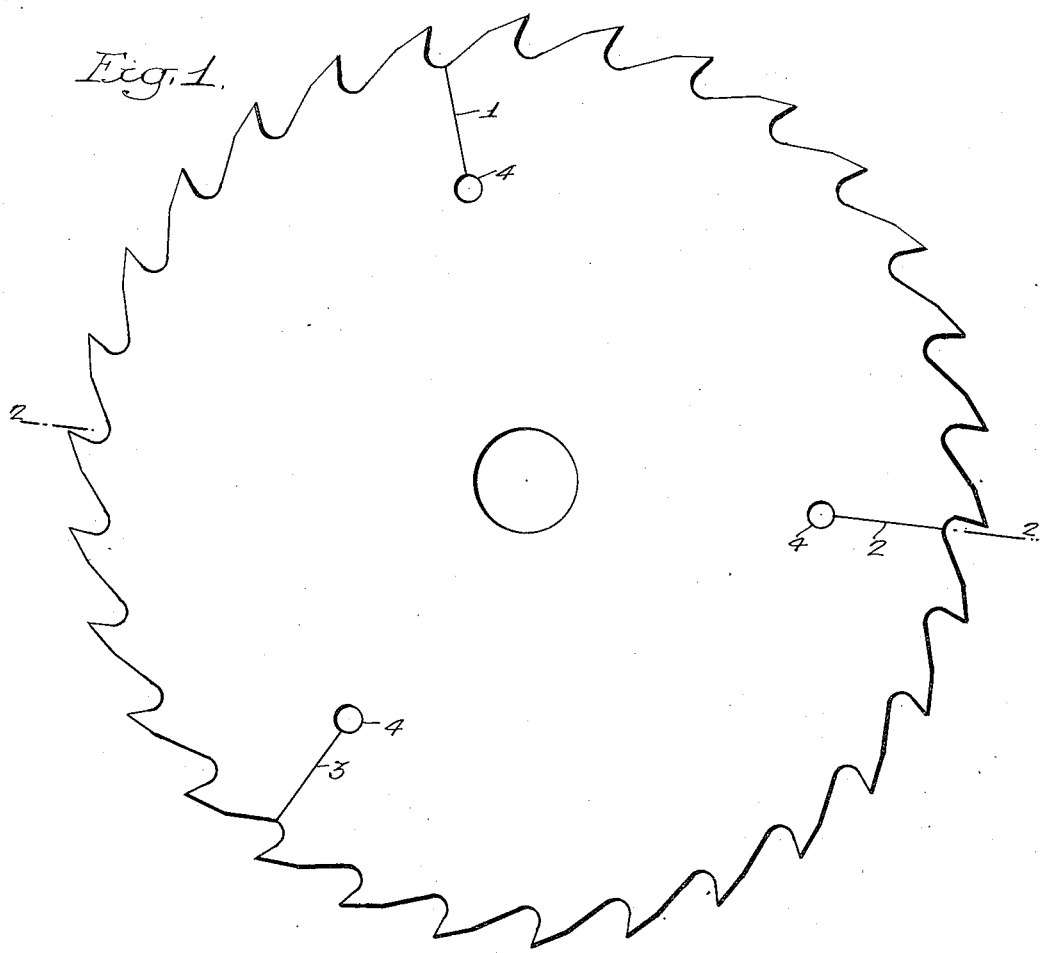

Patented Sept. 10, 1935

2,013,943

UNITED STATES PATENT OFFICE 2,013,943

CIRCULAR SAW

Henry B. Allen, Philadelphia, Pa., assignor to Henry Disston & Sons, Incorporated, Tacony, Pa., a corporation of Pennsylvania Application March 29, 1933, Serial No. 663,419

2 Claims. (Cl. 143—137)

My invention relates to circular saws, and a principal object of the invention is to so design the circular blade that it may be capable of operation under present-day high-speed and heavy-duty conditions without the danger of cracking frequently experienced with blades of the prior forms.

Circular saw blades are subject to operating stresses which tend to rupture the rim. The stresses contributing most largely to such failure are those commonly known as "fatigue stresses" resulting from repeated straining of the blade material beyond the "fatigue limit". This limit has been accurately established for various materials, and for steel, the material of which saw blades are commonly made, is commonly found to be approximately 40% of the ultimate strength of the material. These fatigue stresses may be produced in various ways. They may, for example, be caused primarily by impact upon the teeth as the saw is cutting. The stresses may also be induced by passage of the teeth through the air causing a pulsation of the air at the rim of the saw at a certain definite frequency. When this frequency corresponds with the natural vibration frequency of the blade, the resulting synchronization sets up a vibration at the rim of great intensity and a fatigue crack is apt to occur.

Heretofore it has been customary to provide circular saw blades with slots extending inwardly from the rim periphery, it having been found that in some instances such slots tended to prevent cracking of the blade. The reason for the tendency of a blade to crack and the reason why these rim slots in some instances apparently prevented cracking was not clearly understood. It had generally been considered that the cause of such cracking was due to heating of the saw rim in operation and by centrifugal stresses. The possible stresses, however, from both of these causes are so small as to be a negligible consideration. Not only were the previously proposed slots inadequate in many instances to prevent fatigue cracking of the blades, but being of substantial width, they were undesirable by reason of their interference with the pawl fingers used on automatic sharpening machines; and also these slots tended to spoil the teeth at those points on the blade as the latter was reduced in diameter due to wear.

I have discovered that one reason for the lack of effectiveness of the slots to prevent fatigue cracking of the blade was due to the fact that these slots invariably were located in uniformly spaced series around the blade. Since the principal cause of fatigue is due to vibrations set up in the blade, as set forth above, these equally spaced slots failed to break up the vibrations which were still induced in the uniformly sized and distributed neighboring sections of the blade. In accordance with my invention, I break up the continuity of the rim of the blade by means separated by unequal intervening spaces, and preferably the said means takes the form of slits formed by shearing the blade inwardly from the rim toward the center of the blade to a point sufficiently far from the rim to effectively prevent transmission of harmful vibrations from one rim section to the adjacent sections. When such a slit is formed by shearing and the adjacent parts of the blade have subsequently been forced back into alignment, the division line is an extremely narrow one, which while entirely effective as a means for destroying the continuity of the rim portion of the blade and thereby to break up the aforesaid harmful vibrations, still offers no obstacle to sharpening the blade on automatic sharpening machines, nor has any undesirable effect upon the saw tooth at any period during the life of the blade. The slits being unevenly distributed around the rim of the blade, periodic vibrations in the rim section from any cause are prevented and the resultant tendency to fatigue cracking of the rim of the blade avoided.

In the attached drawing I have illustrated a blade made in accordance with my invention, in which:

Figure 1 is a face view of the blade;

Fig. 2 is a section on the line 2—2, Fig. 1, and

Fig. 3 is a view illustrating the preferred method of forming the vibration-preventing slits.

With reference to Fig. 1 of the drawing, it will be noted that the blade is provided with three slits 1, 2 and 3, each slit terminating at one end in the periphery of the blade, and at the other in a circular hole 4 located at a point sufficiently distant from the rim to preclude transmission of vibrations between the adjacent rim sections. In forming the slits, the holes 4 are first formed in uneven spacing around the center of the blade, and the slits are then produced by means of a shear blade 5, see Fig. 3. Thereafter the displaced portions 6 of the blade are forced back into the normal plane of the blade and into alignment with the adjoining sections.

I claim:

1. An integral circular saw blade having a plurality of narrow slits extending inwardly from the rim and unevenly spaced with respect to each other at the periphery.

2. An integral saw blade having separated peripheral portions of substantial radial dimensions and of unequal size, preventing periodic vibration of the rim section of the saw blade and the resultant tendency of fatigue cracking of the rim of the blade.

HENRY B. ALLEN.